United States Patent
Oag et al.

(10) Patent No.: US 10,138,705 B2
(45) Date of Patent: Nov. 27, 2018

(54) FLOW RESTRICTION DEVICE FOR WELL BORE

(71) Applicant: SHELL OIL COMPANY, Houston, TX (US)

(72) Inventors: James George Oag, Aberdeen (GB); Rae Andrew Younger, Ellon (GB); Simon McKay, Aberdeen (GB)

(73) Assignee: SHELL OIL COMPANY, Houston, TX (US)

( * ) Notice: Subject to any disclaimer, the term of this patent is extended or adjusted under 35 U.S.C. 154(b) by 217 days.

(21) Appl. No.: 15/037,238

(22) PCT Filed: Nov. 18, 2014

(86) PCT No.: PCT/GB2014/053398
§ 371 (c)(1),
(2) Date: May 17, 2016

(87) PCT Pub. No.: WO2015/075428
PCT Pub. Date: May 28, 2015

(65) Prior Publication Data
US 2016/0290085 A1    Oct. 6, 2016

(30) Foreign Application Priority Data

Nov. 19, 2013 (GB) .................................. 1320435.9

(51) Int. Cl.
| | |
|---|---|
| *E21B 34/06* | (2006.01) |
| *E21B 29/02* | (2006.01) |
| *E21B 29/08* | (2006.01) |
| *F16K 7/07* | (2006.01) |
| *E21B 43/12* | (2006.01) |
| *F16K 17/40* | (2006.01) |

(52) U.S. Cl.
CPC .............. *E21B 34/06* (2013.01); *E21B 29/02* (2013.01); *E21B 29/08* (2013.01); *E21B 34/063* (2013.01); *E21B 43/12* (2013.01); *F16K 7/07* (2013.01); *F16K 13/04* (2013.01)

(58) Field of Classification Search
CPC .... E21B 33/12; E21B 33/127; E21B 33/1275; E21B 33/1277; E21B 33/1285; E21B 34/06; E21B 29/08; E21B 43/12; E21B 34/063; E21B 29/02; F16K 7/07
See application file for complete search history.

(56) References Cited

U.S. PATENT DOCUMENTS

| | | | |
|---|---|---|---|
| 3,367,422 | A | 2/1968 | Sims |
| 3,552,712 | A | 1/1971 | Whitlock |
| 4,303,100 | A | 12/1981 | Kalb |
| 6,966,373 | B2 * | 11/2005 | Von Gynz-Rekowski ................. E21B 33/12 138/93 |
| 2007/0125547 | A1 | 6/2007 | Reid et al. |
| 2011/0226491 | A1 | 9/2011 | Telfer |

FOREIGN PATENT DOCUMENTS

| | | |
|---|---|---|
| CN | 101421485 A | 4/2009 |
| WO | WO2012058544 | 5/2012 |

* cited by examiner

*Primary Examiner* — Brad Harcourt

(57) ABSTRACT

A flow restriction device for restricting flow through a conduit.

15 Claims, 4 Drawing Sheets

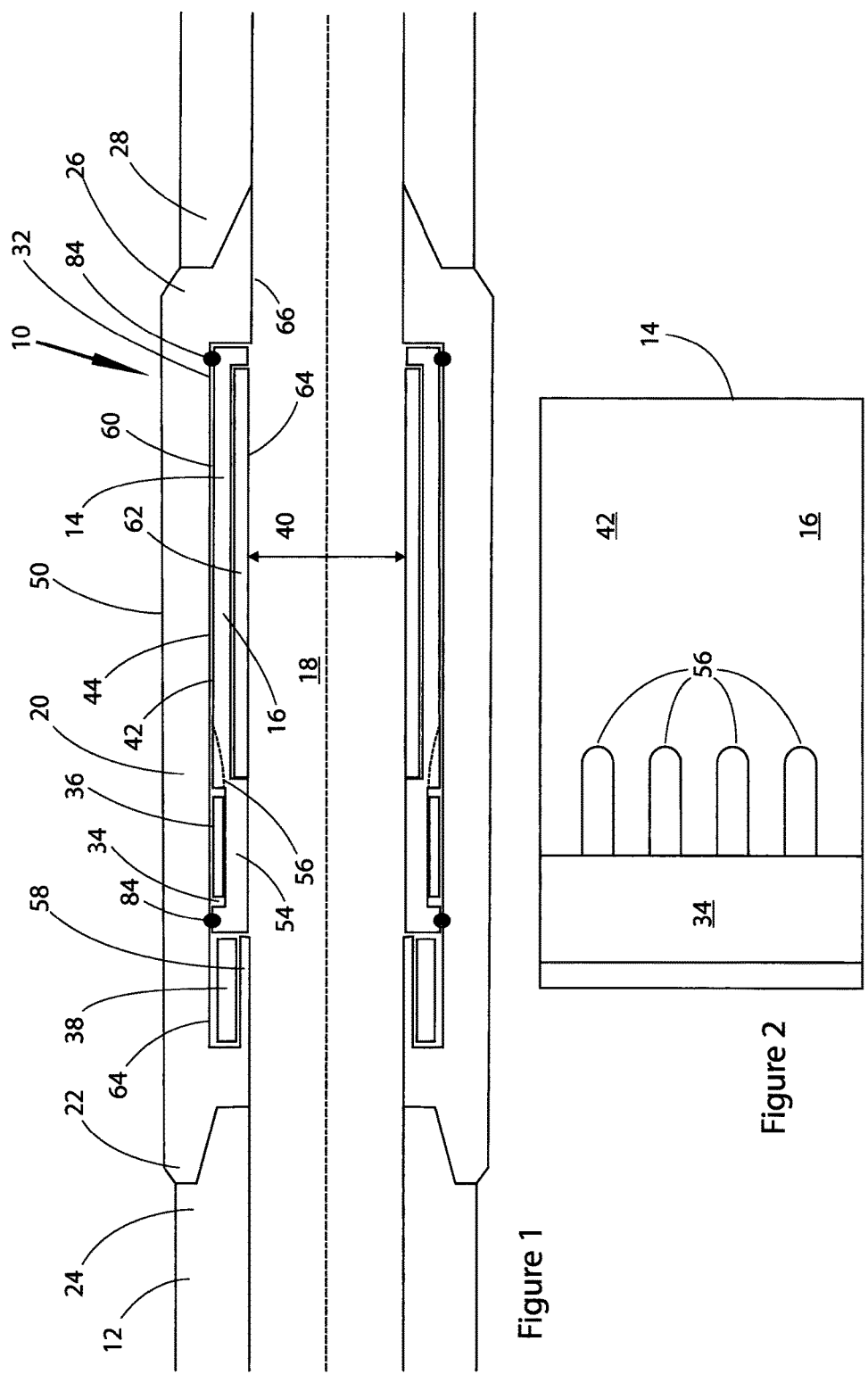

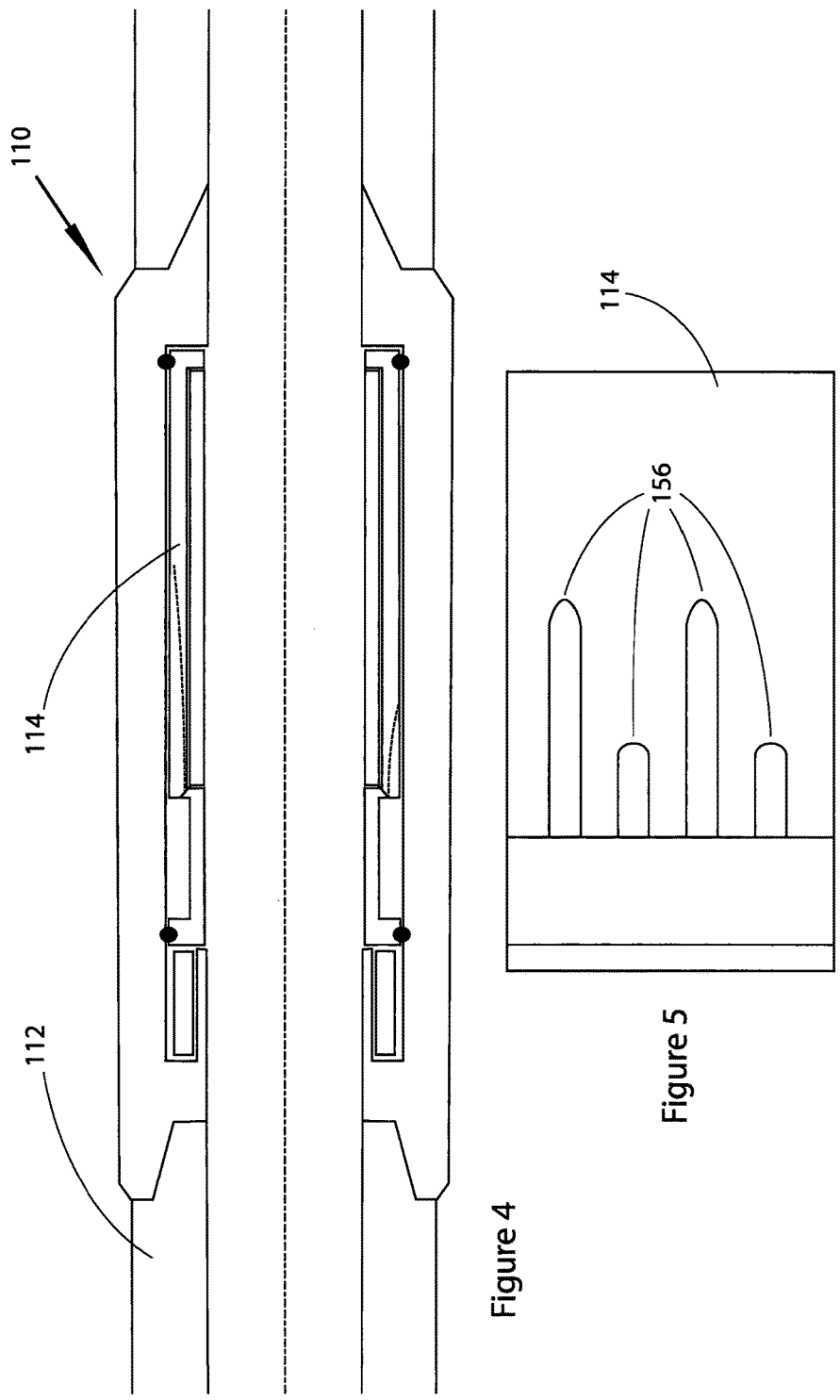

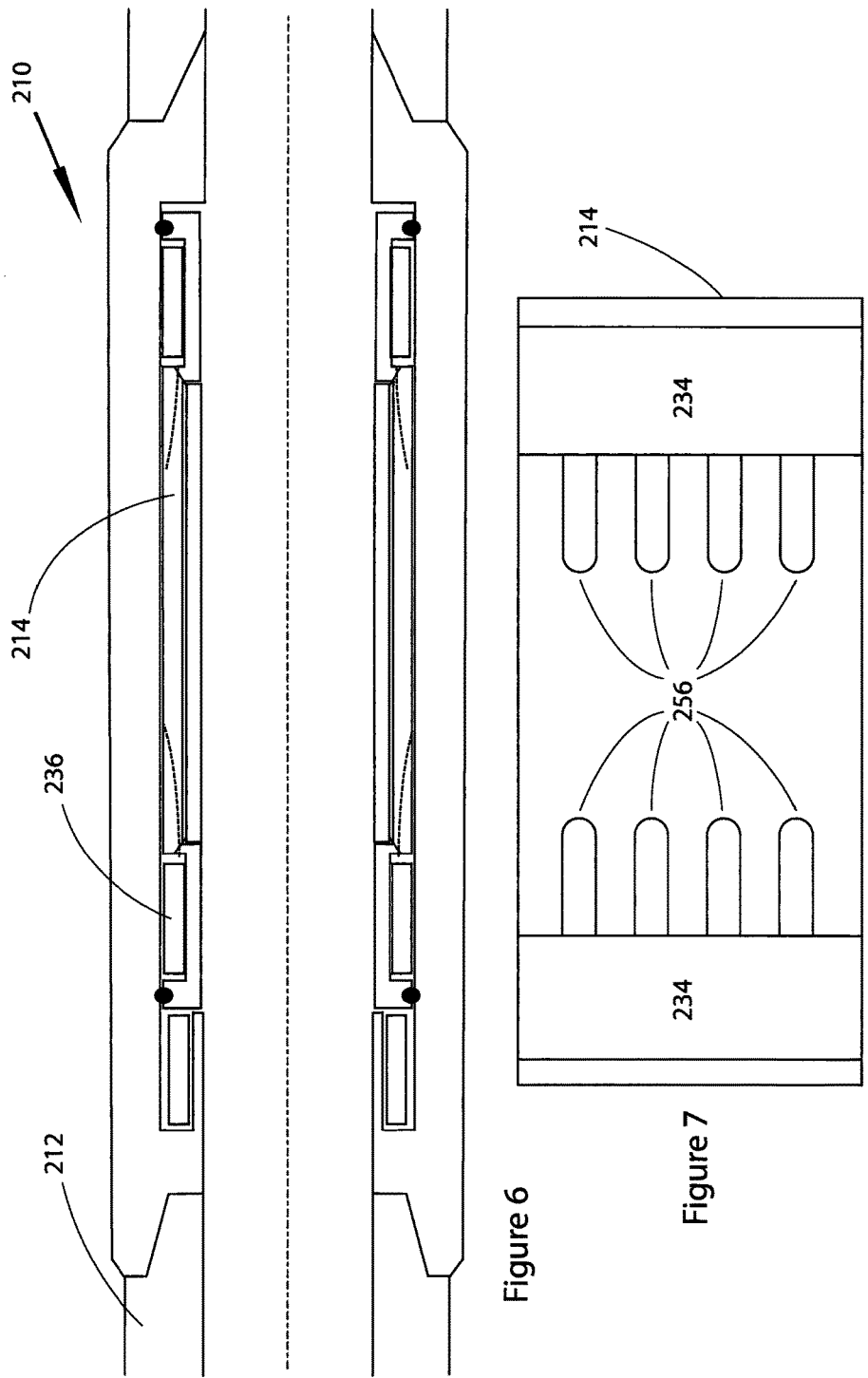

FLOW RESTRICTION DEVICE FOR WELL BORE

FIELD OF THE INVENTION

The present invention relates to a flow restriction device for use in a well bore. Particularly, but not exclusively, the present invention relates to a flow restriction device for reducing a well bore diameter.

BACKGROUND OF THE INVENTION

Drilling and completion operations for creating a well bore transporting oil and gas from a downhole location to surface have an associated risk of leakage of hydrocarbons into the environment or in a worst-case scenario, a catastrophe such as an explosion and consequential loss of life.

Safety devices are provided in well bores to allow the well to be shut down and sealed in the event of an emergency situation. The most commonly used safety device is the blowout preventer (BOP) which is mounted on the wellhead. The BOP has a number of closure devices such as rams which come together when required to form a seal and contain the well.

If the BOP fails or there is a breach below the BOP, hydrocarbons can be released and it can be very difficult to recover the situation.

Other methods of closing or restricting the flow through a well bore have been disclosed such as the collapsible casing device disclosed in WO2012/058544, the contents of which are incorporated herein by reference. The device described in this document uses an explosive charge located behind the deformable insert to reduce or restrict the diameter of the well bore by deforming the insert into the well bore under the effects of the explosive charge. The deformable insert described in WO'544 has to have sufficient strength to withstand well pressure to protect explosive material from being compressed.

SUMMARY OF THE INVENTION

According to a first aspect of the present invention there is provided a flow restriction device for restricting flow through a conduit, the flow restriction device comprising:

a deformable insert having a wall section having an inner surface and an outer surface and defining a throughbore, the wall section having properties that are conducive to deformation, the deformable insert being adapted, in use, to be located in or adjacent to an insert support;

at least one pressure generating material portion adapted in use, to generate a deformation force in response to an activation signal, the deformation force adapted to deform the deformable insert wall section when applied to the deformation insert outer surface to reduce a throughbore cross sectional area; and at least one trigger adapted to generate the/each activation signal;

wherein, in use, when the flow restriction device is exposed to an internal throughbore pressure, a force generated on the deformable insert inner surface by the internal throughbore pressure is substantially resisted by the deformable insert in combination with the insert support such that deformation of the deformable insert by the internal throughbore pressure is limited.

In at least one embodiment of the present invention, a flow restriction device is provided for use in a wellbore and particularly for reducing the diameter of a wellbore to restrict flow through the wellbore in the event of an emergency. By the provision of an insert support which bears a proportion of the wellbore pressure generated force acting on the deformable insert, the designer is provided with greater flexibility in determining the mechanical properties of the deformable insert, allowing the designer greater freedom to tailor the insert deformation to the flow restriction to be achieved.

It will be understood that the throughbore can have a circular or non-circular cross-section.

The flow restriction device may be adapted, in use, to be located in a conduit.

In at least one embodiment, the conduit defines a conduit wall.

In these embodiments, the insert support may be the conduit wall.

In some embodiments, the conduit may be a conduit for hydrocarbons.

The hydrocarbon conduit may be well casing. Alternatively, the hydrocarbon conduit may be defined by a device such as a blowout preventer or a riser. The hydrocarbon conduit may be any device or tubular which defines a conduit through which hydrocarbons can flow or through which fluids associated with hydrocarbon production can flow in or out of the well. In these embodiments, the deformable insert may be located in the hydrocarbon conduit such that the hydrocarbon conduit acts as the insert support and the internal throughbore pressure is well pressure.

Alternatively or additionally, the flow restriction device may further comprise a body.

The body may be adapted to receive the deformable insert.

The body may define a recess adapted to receive the deformable insert.

The body may define a through bore, the body through bore being substantially the same as the deformable insert throughbore.

The deformable insert may be attachable to the body.

The deformable insert may be attachable to the body at an interface.

The deformable insert may be releasably attachable to the body.

The deformable insert may be sealingly attachable to the body. In some embodiments, one or more seals may be provided to ensure fluid flowing through the conduit does not bypass the deformable insert. In alternative embodiments, the deformable insert may form an interference fit or partial seal through contact with the body.

The body may comprise a body portion, the body portion being the insert support.

The flow restriction device may define at least one pressure generating material storage location.

The at least one pressure generating material storage location may be a cavity.

The storage location may be at least partially defined or fully defined by the deformable insert wall section.

Alternatively or additionally, the storage location may be defined, in use, by the insert support and the deformable insert.

Where the insert support is a portion of a flow restrictor device body, the storage location may be defined by the device body alone or in combination with the deformable insert.

The storage location may be in fluid communication with the deformable insert wall section.

The storage location may be in fluid communication with the deformable insert wall section outer surface.

The deformable insert and/or the flow restriction device body may define at least one channel, the/each channel providing fluid communication between the storage location and the wall section.

The at least one channel may be a flute. The/each channel may extend along interface between the device body and the deformable insert.

The/each channel may have a length. The length of one channel may be different to the length of another channel.

In at least one embodiment, the at least one pressure generating material portion is combustible.

In this embodiment, the/each pressure generating material portion combusts in response to the/each activation signal.

In this embodiment, combustion of the pressure generating material, creates a gas, the gas generating a pressure which results in the deformation force applied to the deformable insert outer surface.

At least one of the/each pressure generating material portions may be a propellant material. The propellant material may be Ammonium perchlorate or any other suitable propellant material known in the art.

Alternatively or additionally, at least one of the/each pressure generating material portions may be an explosive material. The explosive material may comprise High Melting Explosive (HMX), Cyclotrimethylenetrinitramine (RDX) or any other suitable explosive material known in the art.

In further alternative or additional embodiments at least one of the/each pressure generating material portions may be an oxidiser material. The oxidiser material may be Potassium perchlorate or any other suitable oxidiser material known in the art.

The at least one pressure generating material portion may comprise a plurality of pressure generating material portions.

Where there are a plurality of pressure generating materials portions, at least one pressure generating material portion may generate a deformation force in response to a first activation signal and at least one other pressure generating material portion may generate a deformation force in response to a second activation signal.

The second activation signal may be subsequent to the first activation signal.

Alternatively or additionally, the second activation signal may be concurrent with the first activation signal.

In alternative embodiments, where there are a plurality of pressure generating material portions, at least one pressure generating material portion and at least one other pressure generating may generate a deformation force in response to the same activation signal.

It will be understood that may be any number of activation signals activating any number of pressure generating material portions, the activation signals activating the pressure generating materials in any combination of sequences.

The deformation force may be adapted to induce a first deformation on the deformable insert wall section.

The flow restriction device may further comprise a deformation mechanism adapted to facilitate a second deformable insert deformation.

The second deformable insert deformation may be a bypass.

The bypass may be adapted to permit fluid flowing through the conduit to flow into a void generated by the first deformation and defined by the deformable insert wall section and the insert support. Such an arrangement can facilitate a second deformation due to the force applied by the fluid to the outer surface of the deformable wall insert, the second deformation further reducing the through bore cross-sectional area and thereby restricting the flow. In some embodiments, the more the flow is restricted the more fluid flows through the bypass leading to further restriction of the flow. That is, the deformation mechanism utilises the flow of fluid to be restricted to improve the restriction effect.

The bypass may be opened by the action of the first deformation.

In some embodiments, the bypass may be opened as the deformable insert deforms.

Alternatively or additionally, the bypass may comprise a closure, the closure adapted to rupture under the action of the deformation force.

The flow restriction device may further comprise a pressure relief mechanism for relieving pressure generated by the pressure generating material, in use, between the deformable insert outer surface and the insert support. Such an arrangement allows for excessive pressure build up behind the deformable insert to be relieved. This prevents the pressure build up from over deforming the sleeve and allows consistent closure irrespective of well bore pressure.

The pressure release mechanism may be adapted to rupture at a threshold pressure.

In at least one embodiment, the pressure release mechanism and the deformation mechanism may be the same.

The flow restriction device may further comprise a deformable insert sleeve. The deformable insert sleeve may be located on the deformable insert internal surface.

The deformable insert sleeve may be adapted to collapse as the deformable insert deforms. Such an arrangement improves the flow restriction provided by the deformed insert as they collapsed insert sleeve forms a plastic the plastic seal with itself.

According to a second aspect of the present invention there is provided a method of restricting flow through a conduit, the method comprising the steps of:

providing a flow restriction device in a conduit, the conduit having a throughbore, the flow restriction device having at least one trigger, at least one pressure generating material, a deformable insert and an insert support, the flow restriction device being arranged such that when the flow restriction device is exposed to an internal throughbore pressure, a force generated on a deformable insert inner surface by the internal throughbore pressure is substantially resisted by the deformable insert in combination with the insert support such that deformation of the deformable insert by the internal throughbore pressure is limited;

activating the at least one trigger to generate an at least one activation signal, the activation signal being transmitted to the at least one pressure generating material portion the/each pressure generating material generating a deformation force in response to the activation signal, the deformation force deforming a deformable insert wall section to reduce the flow restriction device throughbore cross sectional area.

According to a third aspect of the present invention there is provided a flow restriction device for restricting flow through a wellbore, the flow restriction device comprising:

a deformable insert having a wall section having an inner surface and an outer surface and defining a throughbore, the wall section having properties that are conducive to deformation, the deformable insert being adapted, in use, to be located in or adjacent to an insert support;

at least one pressure generating material portion adapted in use, to generate a deformation force in response to an activation signal, the deformation force adapted to deform the deformable insert wall section when applied to the deformation insert outer surface to reduce a throughbore cross sectional area; and at least one trigger adapted to generate the/each activation signal;

wherein, in use, when the flow restriction device is exposed to well pressure, a force generated on the deformable insert inner surface by the internal throughbore pressure is substantially resisted by the deformable insert in combination with the insert support such that deformation of the deformable insert by the internal throughbore pressure is limited.

It will be understood that features associated with the first aspect may be equally applicable to the second and third aspects but have not been repeated for brevity.

BRIEF DESCRIPTION OF THE DRAWINGS

Embodiments of the present invention will now be described with reference to the accompanying drawings in which:

FIG. 1 is a section of a flow restriction device for restricting flow through a well bore casing according to a first embodiment of the present invention;

FIG. 2 is a plan view of the deformable insert of the flow restriction device of FIG. 1;

FIG. 4 is a section of a flow restriction device for restricting flow through a well bore casing according to a second embodiment of the present invention;

FIG. 5 is a plan view of the deformable insert of the flow restriction device of FIG. 4;

FIG. 6 is a section of a flow restriction device for restricting flow through a well bore casing according to a third embodiment of the present invention; and FIG. 7 is a plan view of the deformable insert of the flow restriction device of FIG. 6.

DETAILED DESCRIPTION OF THE DRAWINGS

Figure 3:
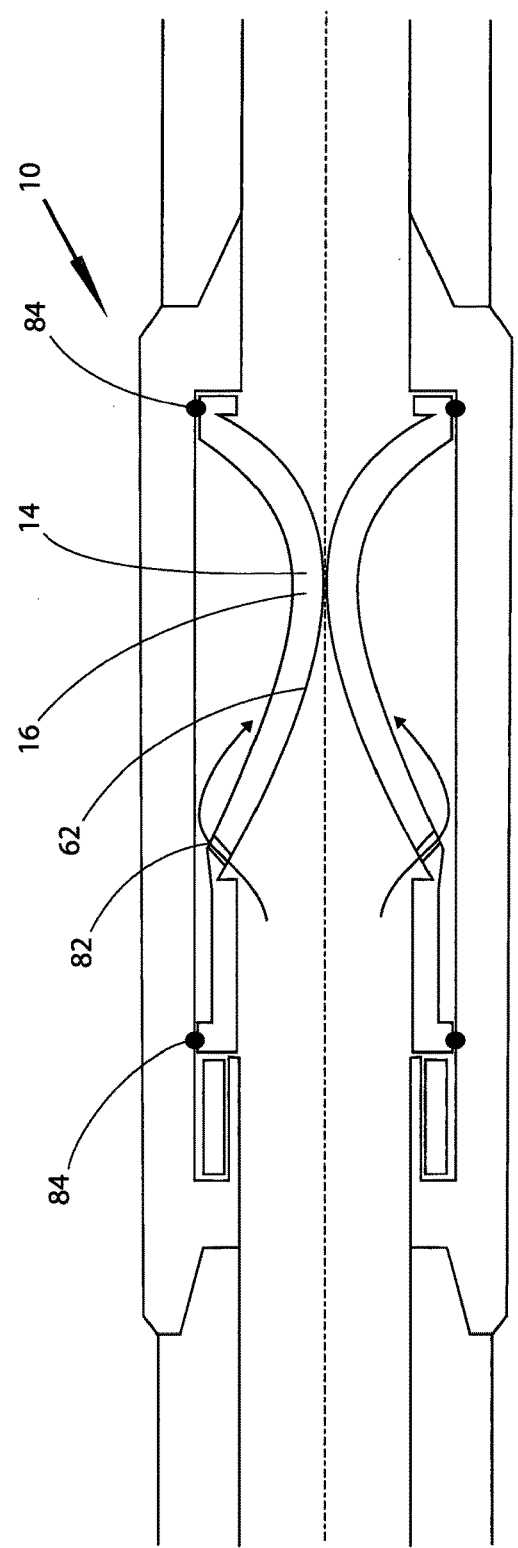
FIG. 3 is a section of the flow restriction device of FIG. 1 after deformation.

Referring firstly to FIG. 1, a section of a flow restriction device, generally indicated by reference numeral 10, for restricting flow through a well bore casing 12, according to a first embodiment of the present invention. The flow restriction device 10 comprises a deformable insert 14 having a wall section 16 defining a throughbore 18. The deformable insert 14 is housed within a flow restriction device body 20. The device body 20 is threadedly connected at a device body first end 22 to a first casing section 24 and at a device body second end 26 to a second casing section 28. The deformable insert 14 is located within a device body recess 44 defined by an internal surface 32 of the device body 20.

The deformable insert 14 is manufactured from a single piece of 316 stainless steel and comprises a deformable wall section 16, having properties which are conducive to deformation and a deformable insert recess wall portion 54 defining an external recess 34 adapted to receive a pressure generating material portion 36 in the form of a propellant, ammonium perchlorate. The pressure generating material portion 36 is adapted, in use, to generate a deformation force in response to an activation signal transmitted to the pressure generating material 36 by a trigger 38 housed in a void 64 created by the provision of a lip 58 defined by the housing body 20.

The deformation force generated by the pressure generating material portion 36 in response to the actuation signal is adapted to deform the deformable wall section 16 to reduce the throughbore cross sectional area 40 and restrict flow through the throughbore 18, as will be discussed in due course.

In the undeformed configuration shown in FIG. 1, it can be seen that an insert wall section external surface 42 is in contact with a device body recess surface 32 and sealed at each end by two o-ring seals 84. In normal use, the well bore pressure within the conduit 12 generates a force which acts on the deformable insert 14 and is resisted by the deformable insert 14 in combination with the device body 20 which acts as an insert support. The body 20 is rated such that the body wall 50 can substantially withstand the well bore pressure such that deformation of the deformable insert 14 by the well bore pressure is limited. Such an arrangement provides freedom for the designer to tailor the design of the deformable insert 14 and the deformation induced by the pressure generating material 36 to achieve the flow restriction required.

It will be noted that the thickness of a deformable insert recess wall portion 54 behind which the pressure generating material 36 is stored, is substantially thicker than the deformable wall section 16. This is to ensure that the pressure generating material 36 is not compressed by the deformable insert recess wall 54 deforming under the wellbore pressure to close the external recess 34.

The deformation insert wall section 16 defines a throughbore recess 60 in which a sacrificial PEEK sleeve 62 is located. The sleeve 62 is sized such that the sleeve internal surface 64 combines with the surfaces of the conduit 12, the deformable insert recess wall 54 and the body 14 to provide a continuous device internal surface 66 and define the through bore diameter 44. Such an arrangement reduces wear on the components of the flow restriction device 10 as hydrocarbons flow through the conduit 12. As will be shown, during deformation of the wall section 16, the sleeve 62 deforms with the wall section 16 and enhances the closure of the throughbore 18 by one portion of the deformable insert 62 coming into contact, or close proximity, with another portion of the deformable insert 62.

Referring now to FIG. 2, a plan view of the deformable insert 14 of the flow restriction device 10 of FIG. 1, it can be seen the external surface 42 of the insert 14 defines a plurality of flutes 56 (also shown in broken outline in FIG. 1) each flute 56 providing a flow path from the insert recess 34 to the deformable wall section 16.

Referring now to FIG. 3, there is shown a section view of the flow restriction device 10 of FIG. 1 after deformation. In this Figure it can be seen that the wall section 16 of the deformable insert 14 has been deformed inwardly to reduce the throughbore 18 cross sectional area. The sacrificial sleeve 62 has collapsed with the wall section 16 to form a seal with itself and further restrict the throughbore 18.

FIG. 3 also shows a bypass 80 has been opened in the wall section 16 by the deformation of the wall section 16. This bypass 80 permits flow through the wall section 16, in the direction of the arrows shown on FIG. 3, in to a void 82 generated by the deformation. The fluid flowing through the bypass 80 is sealed within the void 82 by the o-ring seals 84, increasing the closing pressure and inducing a second deformation of the deformable insert wall section 16 further reducing the throughbore cross sectional area and further enhancing the flow restriction effect.

Reference is now made to FIG. 4, a section of a flow restriction device 110 for restricting flow through the wellbore casing 112 according to a second embodiment of the present invention and FIG. 5, a plan view of the deformable insert 114 of the flow restriction device 110 of FIG. 4.

The flow restriction device 110 of FIG. 4 is largely the same as the fluid restriction device 10 of FIG. 1. The primary difference can be seen most clearly on FIG. 5 from which it will be noted that the flutes 156 are of varying length. Such an arrangement permits the designer to achieve a particular flow restriction profile in the deformed deformable insert 114.

Reference is now made to FIG. 6, a section of a flow restriction device 210 for restricting throw flow through a well bore casing 212 according to a third embodiment of the present invention and FIG. 7, a plan view of the deformable insert 214 of the flow restriction device 210 of FIG. 5. In this embodiment, there are flutes 256 at each end of the wall section 216 and there are two pockets 234 containing two separate pressure generating materials 236. In this embodiment, the pressure generating materials 236 are triggered at different times to induce a still further alternative deformation profile. Both pressure generating materials are triggered by activation signals sent by the trigger 238 to each pressure generating material 236.

Various modifications and improvements may be made to the above described embodiments without departing from the scope of the present invention. For example, the sleeve 62 of the first embodiment is PEEK. Any suitable engineering plastic or other material could be used such as ceramic. Additionally, the device body is attached to the first and second conduits by means of a threaded connection. Other forms of connection could be used such as interference fit.

What is claimed is:

1. A flow restriction device for restricting flow through a conduit, the flow restriction device comprising:
   a deformable insert having a wall section having an inner surface and an outer surface and defining a throughbore, the wall section having properties that are conducive to deformation, the deformable insert being adapted, in use, to be located in or adjacent to an insert support;
   at least one pressure generating material portion adapted in use, to generate a deformation force in response to an activation signal, the deformation force adapted to induce a first deformation on the deformable insert wall section when applied to the deformation insert outer surface to reduce a throughbore cross sectional area; and
   at least one trigger adapted to generate the activation signal;
   wherein, in use, when the flow restriction device is exposed to an internal throughbore pressure, a force generated on the deformable insert inner surface by the internal throughbore pressure is substantially resisted by the deformable insert in combination with the insert support such that deformation of the deformable insert by the internal throughbore pressure is limited, wherein the flow restriction device comprises a deformation mechanism adapted to facilitate a second deformable insert deformation, and wherein the second deformable insert deformation is a bypass.

2. A flow restriction device according to claim 1 adapted, in use, to be located in the conduit.

3. A flow restriction device according to claim 2 wherein the insert support is the conduit wall.

4. A flow restriction device according to claim 1 further comprising a body.

5. A flow restriction device according to claim 4 wherein the body is adapted to receive the deformable insert.

6. A flow restriction device according to claim 5 wherein the body defines a recess adapted to receive the deformable insert.

7. A flow restriction device according to claim 5 wherein the body defines a through bore, the body through bore being substantially the same as the deformable insert throughbore.

8. A flow restriction device according to claim 4 wherein the deformable insert is attachable to the body.

9. A flow restriction device according to claim 8 wherein the deformable insert is attachable to the body at an interface.

10. A flow restriction device according to claim 8 wherein the deformable insert is releasably attachable to the body.

11. A flow restriction device according to claim 8 wherein the deformable insert is sealingly attachable to the body.

12. A flow restriction device according to claim 11 comprising one or more seals are provided to ensure fluid flowing through the conduit does not bypass the deformable insert.

13. A flow restriction device according to claim 11 wherein the deformable insert forms an interference fit or partial seal through contact with the body.

14. A method of restricting flow through a conduit, the method comprising the steps of:
   providing a flow restriction device in a conduit, the conduit having a throughbore, the flow restriction device having at least one trigger, at least one pressure generating material, a deformable insert and an insert support, the flow restriction device being arranged such that when the flow restriction device is exposed to an internal throughbore pressure, a force generated on a deformable insert inner surface by the internal throughbore pressure is substantially resisted by the deformable insert in combination with the insert support such that deformation of the deformable insert by the internal throughbore pressure is limited;
   activating the at least one trigger to generate an at least one activation signal, the activation signal being transmitted to the at least one pressure generating material portion, the pressure generating material generating a deformation force in response to the activation signal, the deformation force inducing a first deformation on a wall section of the deformable insert to reduce the flow restriction device throughbore cross sectional area, wherein the flow restriction device comprises a deformation mechanism adapted to facilitate a second deformable insert deformation, and wherein the second deformable insert deformation is a bypass.

15. A flow restriction device for restricting flow through a wellbore, the flow restriction device comprising:
   a deformable insert having a wall section having an inner surface and an outer surface and defining a throughbore, the wall section having properties that are conducive to deformation, the deformable insert being adapted, in use, to be located in or adjacent to an insert support;
   at least one pressure generating material portion adapted in use, to generate a deformation force in response to an activation signal, the deformation force adapted to induce a first deformation on the deformable insert wall section when applied to the deformation insert outer surface to reduce a throughbore cross sectional area; and
   at least one trigger adapted to generate the activation signal;

wherein, in use, when the flow restriction device is exposed to well pressure, a force generated on the deformable insert inner surface by the well pressure is substantially resisted by the deformable insert in combination with the insert support such that deformation of the deformable insert by the well pressure is limited, and wherein the flow restriction device comprises a deformation mechanism adapted to facilitate a second deformable insert deformation, and wherein the second deformable insert deformation is a bypass.

* * * * *